(12) United States Patent
Eguchi

(10) Patent No.: US 10,521,707 B2
(45) Date of Patent: Dec. 31, 2019

(54) PRINTING APPARATUS FOR ADJUSTING WIDTH OF OBJECT AND PRINTING METHOD

(71) Applicant: CANON KABUSHIKI KAISHA, Tokyo (JP)

(72) Inventor: Kimimori Eguchi, Kashiwa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/409,338

(22) Filed: Jan. 18, 2017

(65) Prior Publication Data

US 2017/0213115 A1 Jul. 27, 2017

(30) Foreign Application Priority Data

Jan. 26, 2016 (JP) .................. 2016-012865

(51) Int. Cl.
*G06K 15/02* (2006.01)

(52) U.S. Cl.
CPC ..... *G06K 15/1847* (2013.01); *G06K 15/1802* (2013.01); *G06K 15/1872* (2013.01); *G06K 15/1873* (2013.01)

(58) Field of Classification Search
None
See application file for complete search history.

(56) References Cited

U.S. PATENT DOCUMENTS

| 2015/0002903 A1* | 1/2015 | Arai | G06K 15/1872 |
| | | | 358/2.99 |
| 2015/0092244 A1* | 4/2015 | Yamada | H04N 1/4092 |
| | | | 358/3.15 |
| 2015/0181076 A1* | 6/2015 | Mita | H04N 1/401 |
| | | | 358/1.2 |

FOREIGN PATENT DOCUMENTS

| JP | 2012-121265 A | | 6/2012 |
| JP | 2012121265 A | * | 6/2012 |

* cited by examiner

*Primary Examiner* — Henok Shiferaw
(74) *Attorney, Agent, or Firm* — Canon U.S.A., Inc. IP Division

(57) ABSTRACT

A printing apparatus includes a reception unit that receives outline information representing an outline of a character, a generation unit that generates, using the outline information, a bitmap including pixels corresponding to the character, the pixels being associated with a graphic attribute, a changing unit that refers an attribute associated with a pixel adjacent to one of the pixels corresponding to the character, and changes a density value of the adjacent pixel associated with the referred attribute being different from a graphic attribute and a character attribute to a density which is based on a density value of the one pixel, and a printing unit that prints an image based on the bitmap after the change.

22 Claims, 10 Drawing Sheets

FIG. 6A

THICKENING AND THINNING SETTINGS     172

| | | | |
|---|---|---|---|
| TEXT | −1 | 0 | +1 |
| THIN LINE | −1 | 0 | +1 |
| IMAGE | −1 | 0 | +1 |
| GRAPHIC | −1 | 0 | +1 |

DETAILED SETTINGS

FIG. 6B

DETAILED SETTINGS

| | | | |
|---|---|---|---|
| COLOR PLANES TO BE CORRECTED | ALL COLORS | BLACK ONLY | 174 |
| CORRECTION DIRECTION | LONGITUDINAL | LATERAL | 175 |
| BACKGROUND | PROVIDE BACKGROUND | NO BACKGROUND | 176 |

OK

PRINTING APPARATUS FOR ADJUSTING WIDTH OF OBJECT AND PRINTING METHOD

BACKGROUND

Field

The present disclosure relates to a technique for adjusting the width of an object.

Description of the Related Art

There is a demand for changing the image quality of an image to be printed, such as the thickness of thin lines and texts, based on user's preferences. For example, there are demands for a clear output thicker than normal and an output for faithfully reproducing electronic data. In some cases, a user normally using thick fonts demands an output of thin texts to avoid text blurring. Japanese Patent Application Laid-Open No. 2012-121265 discusses a technique for adjusting the width of a text (an object having a text attribute) output from an application. Japanese Patent Application Laid-Open No. 2012-121265 discusses a technique for finding a boundary at which an object having a text attribute is adjacent to an object having another attribute and expanding the object having a text attribute toward the object having the other attribute at the boundary.

A recent application outlines (graphically defines) a text and then sends the outlined text to a printer or a printer driver. Since an outlined text is handled as an object having a graphic attribute, the conventional technique is able to thicken a text object having a text attribute, but is unable to thicken a text object having a graphic attribute.

SUMMARY

Embodiments are directed to provision of a method for adjusting the width of an outlined text.

According to an aspect of the embodiments, a printing apparatus includes a reception unit configured to receive outline information representing an outline of a character, a generation unit configured to generate, using the outline information, a bitmap including pixels corresponding to the character, the pixels being associated with a graphic attribute, a changing unit configured to refer an attribute associated with a pixel adjacent to one of the pixels corresponding to the character, and to change a density value of the adjacent pixel associated with the referred attribute being different from a graphic attribute and a character attribute to a density which is based on a density value of the one pixel, and a printing unit configured to print an image based on the bitmap after the change.

Further features will become apparent from the following description of exemplary embodiments with reference to the attached drawings.

BRIEF DESCRIPTION OF THE DRAWINGS

FIGS. 6A and 6B illustrate user interfaces (UIs) for setting thickening processing.

DESCRIPTION OF THE EMBODIMENTS

Image processing in an image forming apparatus discussed in the present specification will be described in detail below with reference to the accompanying drawings.

Figure 1:
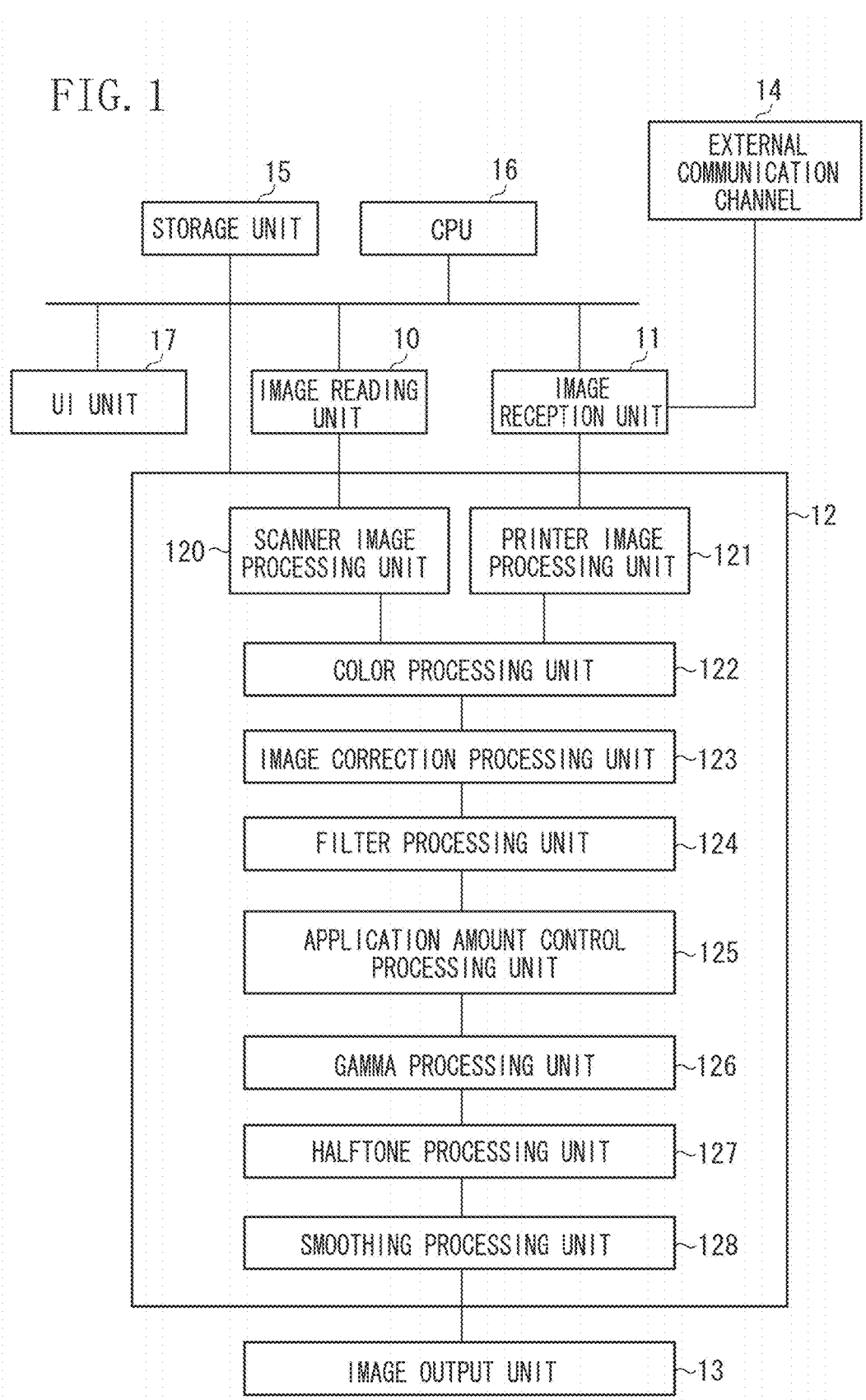
FIG. 1 is a block diagram schematically illustrating an image forming apparatus.

FIG. 1 is a system block diagram illustrating an image forming apparatus according to a first exemplary embodiment. Although, according to the present exemplary embodiment, a multifunction peripheral provided with a scanner and a printer as an image forming apparatus is assumed, not only a multifunction peripheral but also other printing devices such as a single functional printer and the like can be used.

The structure of the image forming apparatus according to the present exemplary embodiment will be described below.

As illustrated in FIG. 1, the image forming apparatus includes a central processing unit (CPU) 16 including at least one processor, a random access memory (RAM), a read only memory (ROM), and a hard disk unit (HDD) as a storage unit 15. The image forming apparatus is also provided with a scanner as an image reading unit 10, a network interface card as an image reception unit 11, a touch screen as a user interface (UI) unit 17, a large-scale integration (LSI) (image processing circuit) as an image processing unit 12, and a printer as an image output unit 13. The image forming apparatus is connected with an external apparatus such as a server for managing image data and a personal computer (PC) for instructing the image forming apparatus to perform printing via an external communication channel 14 such as a local area network (LAN) and the Internet.

Functions of each component of the image forming apparatus illustrated in FIG. 1 will be described below.

The RAM as the storage unit 15 is used as an area for storing data and various types of information and also used as a work area for the CPU 16. The ROM is used as an area for storing various control programs. The HDD is used to temporarily store data received by the image reception unit 11 from an external apparatus and data that has undergone image processing by the image processing unit 12.

The CPU 16 controls each component according to a program stored in the ROM.

The image reading unit 10 reads an image of a document. For example, the image reading unit 10 reads read, green, and blue (RGB) bitmap image data on a document. Then, the read RGB image is sent to the image processing unit 12 (a scanner image processing unit 120).

The image reception unit 11 receives image data (Page Description Language (PDL) data) described in a PDL received from an external apparatus via a network. The received PDL data is sent to the image processing unit 12 (a printer image processing unit 121).

The image processing unit 12 performs image processing on the received image data and sends the processed image data to the image output unit 13.

The image output unit 13 prints an image on paper (a sheet-like recording medium) based on the received image data.

Processing units in the image processing unit 12 for performing various types of image processing will be described below.

The scanner image processing unit 120 performs image processing such as shading correction and image area separation processing on RGB data.

Figure 2:
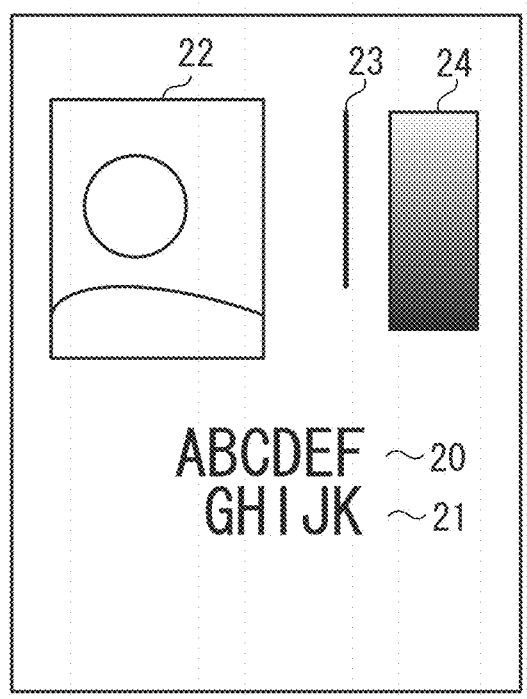
FIG. 2 illustrates example types of attributes.

The printer image processing unit 121 interprets commands included in the PDL data to generate an intermediate code. Subsequently, a raster image processor (RIP) of the printer image processing unit 121 generates RGB bitmap image data based on the intermediate code. The RIP not only generates image data, but also generates (determines) attribute information for each pixel based on attribute information (hereinafter referred to as an attribute) included in the commands. Referring to FIG. 2, example attribute information includes a text attribute 20, a background attribute 21, an image attribute 22, a thin line attribute 23, and a graphic attribute 24. The background attribute 21 refers to a white background including no objects.

When a text code and a font identifier are included in the PDL data, bitmap data of a character shape (glyph) corresponding to the text code and font identifier is generated. Pixels representing this character shape include the text attribute 20. When image data such as a photograph is included in the PDL data, bitmap data of the photograph is generated. Pixels representing the photograph include the image attribute 22. When vector data representing a thin line is included in the PDL data, bitmap data of the thin line is generated. Pixels representing the thin line include the thin line attribute 23.

When outline information (vector data or point sequence data) is included in the PDL data, bitmap data of the graphic having an outline represented by the outline information is generated. Pixels representing the graphic include the graphic attribute 24. Therefore, when an outlined text is included in the PDL data, bitmap data representing the text is generated. Pixels in the text portion include a graphic attribute. This is because an outlined text is represented by the outline information (vector data or point sequence data representing outlines) of the text in the PDL data.

The printer image processing unit 121 can process PDL data as well as other image data represented by commands corresponding to each individual object (also referred to as an image object) constituting the image.

A color processing unit 122 receives an RGB image from the scanner image processing unit 120 or the printer image processing unit 121 and performs color conversion processing on the RGB image to convert it into CMYK (cyan, magenta, yellow, and black) bitmap image data (CMYK image).

An image correction processing unit 123 corrects pixel values (density values) and attributes for the CMYK image. This processing will be described in detail below with reference to FIG. 7.

A filter processing unit 124 performs processing such as edge emphasis by using pixel values and attributes corrected by the image correction processing unit 123. The processed CMYK image is sent to an application amount control processing unit 125.

The application amount control processing unit 125 performs application amount control processing on the received CMYK image by using the attributes corrected by the image correction processing unit 123 and CMYK developing agents (toner) suitable for paper (a sheet-like recording medium). The processed CMYK image is sent to a gamma processing unit 126.

The gamma processing unit 126 performs gamma processing on the received CMYK image by using the attributes corrected by the image correction processing unit 123. The processed CMYK image is sent to a halftone processing unit 127.

The halftone processing unit 127 performs dither processing on the received CMYK image by using the attribute information corrected by the image correction processing unit 123. Error diffusion processing can be performed in addition to dither processing. The processed CMYK image is sent to a smoothing processing unit 128.

Figure 3A:
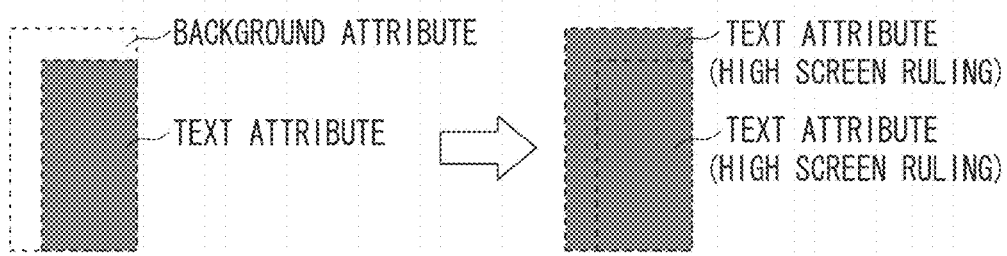
FIGS. 3A, 3B, and 3C illustrate advantages of correcting attributes.

An effect arising from a case where the halftone processing unit 127 uses the attributes corrected by the image correction processing unit 123 will be described below. The halftone processing unit 127 performs optimal dither processing for each attribute. More specifically, the halftone processing unit 127 applies high screen ruling having a dot growth greater than or equal to 200 lines to a text attribute and a thin line attribute to make jaggies inconspicuous. The halftone processing unit 127 applies low screen ruling including a line growth of approximately 130 to 170 to a background attribute, an image attribute, and a graphic attribute to provide a resistance to color variation. When the image correction processing unit 123 performs thickening processing on the object including a text attribute indicated by the left drawing illustrated in FIG. 3A, a CMYK image indicated by the right drawing illustrated in FIG. 3A is obtained. It is important that the attribute of the thickened portion (pixels of the expanded portion of the object) is corrected to a text attribute. Since the halftone processing unit 127 applies high screen ruling based on a text attribute after the correction, jaggies at the thickened portion (pixels of the expanded portion of the object) becomes more inconspicuous than jaggies in a case where low screen ruling is applied.

Figure 4:
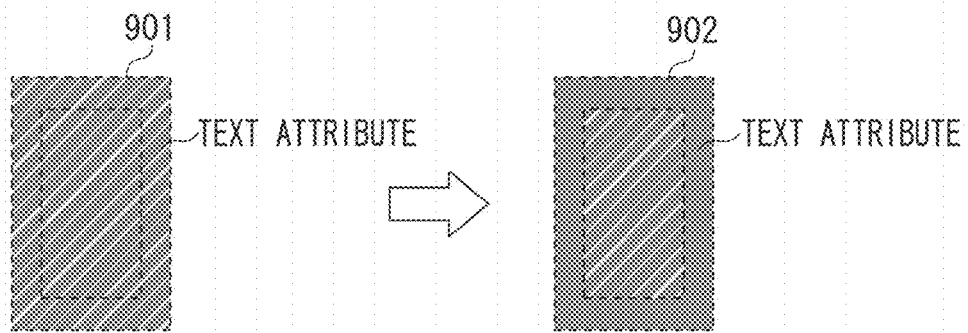
FIG. 4 illustrates an effect of smoothing processing.

The smoothing processing unit 128 performs processing (smoothing processing) for reducing jaggies due to halftone processing, on the received CMYK image. More specifically, as indicated by the left drawing illustrated in FIG. 4, increasing the pixel value of white pixels at edge portions of a text attribute object after dither processing fills spaces by white pixels even after dither processing resulting in reduced jaggies, as indicated by the right drawing illustrated in FIG. 4. This processing is performed on a text attribute object, but is not performed on a graphic attribute object. The reason is as follows. If the pixel value of white pixels is increased to fill spaces by white pixels for a graphic attribute object, a thin white text appears blurring in such images as a thin outline character and a white line having a background of a graphic attribute object.

<Thickening Processing by Image Correction Processing Unit>

Figure 8:
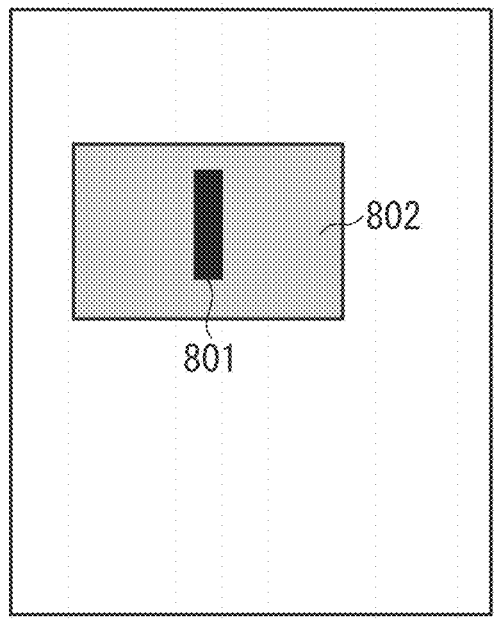
FIG. 8 illustrates an outlined text in a graphic.

The thickening processing by the image correction processing unit 123 will be described below. The present exemplary embodiment will be described below centering on a case where, as illustrated in FIG. 8, a text 801 outlined by an external application executed by an external apparatus such as a PC is drawn in a graphic 802. However, the image forming apparatus according to the present exemplary embodiment suitably processes images in other cases. For example, a case where the text 801 outlined by an external application is not in contact with any object (more specifically, a case where a graphic attribute text is drawn adjacently to pixels having a background attribute) is also suitably processed by the image forming apparatus according to the present exemplary embodiment. The outlined text refers to a text, of which the outline is represented by a vector, which is converted into a graphic. An outlined text includes a graphic attribute. Although a CMYK image is described below as an example, the processing according to the present exemplary embodiment is also applicable to an RGB image.

<UI Screens>

Information settings related to thickening processing performed via the UI unit 17 will be described below with reference to FIGS. 6A and 6B.

Items set via the UI unit 17 will be described below. A user operation via the UI unit 17 is notified to the CPU 16, information about items set by the operation (setting value of each item) is stored in the storage unit 15. Then, the stored information is referenced by the image processing unit 12 (image correction processing unit 123).

First, thickness adjustment on an object is set for each attribute. As illustrated in FIG. 6A, the "Thickening and Thinning Settings" screen includes a UI 172 for specifying a plurality of levels (−1, 0, and +1) indicating thinning, no adjustment, and thickening, respectively, for each attribute. More specifically, when "+1" is specified for an attribute, the attribute is subjected to object width thickening.

A user presses a "detailed settings" button to set in detail how thickness adjustment is performed. Then, the detailed settings screen illustrated in FIG. 6B is displayed.

In the screen illustrated in FIG. 6B, the user sets the following three items: (1) color planes subjected to thickness adjustment, (2) direction in which thickness adjustment is performed, and (3) whether thickness adjustment is performed on an object having a graphic background.

The first item will be described below. As indicated by a UI 174 (color planes to be corrected) illustrated in FIG. 6B, the user specifies "all colors" or "black only" as color planes subjected to object thickness adjustment. When "all colors" is specified, thickness adjustment is performed on all the CMYK color planes constituting the object. When "all colors" is specified, a minimum pixel value (minimum density value) of "0" is set to each of the CMYK color planes as a threshold value to be used in step S1732_2 illustrated in FIG. 7 (described below). When "black only" is specified, thickness adjustment is performed only on the K color plane constituting the object. When "black only" is specified, a maximum pixel value (maximum density value) of "255" is set for each of the CMY color planes as a threshold value to be used in step S1732_2 illustrated in FIG. 7 (described below), and the minimum pixel value of "0" is set only for the K color plane.

The second item will be described below. The printing width of one pixel can differ between the main and sub scanning directions depending on variation of device characteristics. Therefore, as indicated by a UI 175 (correction direction) illustrated in FIG. 6B, the user specifies "longitudinal" direction and/or "lateral" direction with respect to the paper conveyance direction as a direction in which object thickness adjustment is performed. According to the information specified in the UI 175, the number and arrangements of reference pixels with respect to a target pixel are determined as illustrated in FIGS. 10A to 10C in the processing window for object thickness adjustment.

Figure 10A:
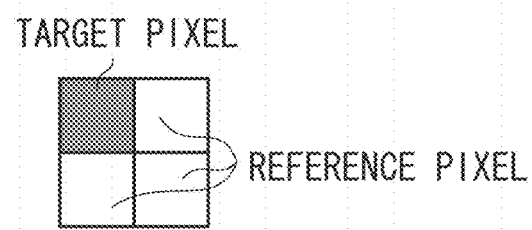
FIGS. 10A, 10B, and 10C illustrate processing windows including a target pixel and at least one reference pixel.
Figure 10B:
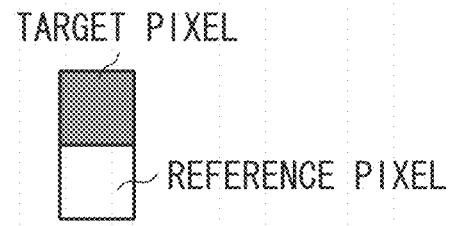
Figure 10C:
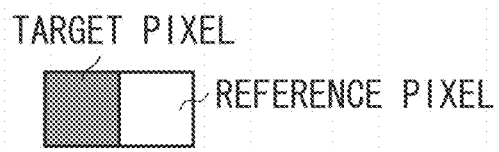

FIG. 10A illustrates a processing window set when the user specifies both the longitudinal and lateral directions. In this processing window, three reference pixels are set adjacently to the target pixel in three directions (right, bottom right, and bottom directions). FIG. 10B illustrates a processing window set when the user specifies only the longitudinal direction. In this processing window, one reference pixel is set adjacently to the target pixel in one direction (bottom direction). FIG. 10C illustrates a processing window set when the user specifies only the lateral direction. In this processing window, one reference pixel is set adjacently to the target pixel in one direction (right direction). More specifically, referring to FIGS. 10A to 10C, the image correction processing unit 123 sets as a target pixel either one of at least two adjacent pixels included in image data and sets the other pixel as a reference pixel.

The pixel value of the target pixel is changed based on the pixel values of reference pixels by using the processing windows set as described above. More specifically, when the object positioned at the reference pixel differs from the object positioned at the target pixel, the object positioned at the reference pixel is thickened (expanded) toward the target pixel. More specifically, when the object having an attribute to be subjected to thickening specified by the above-described UI 172 is positioned at the reference pixel, and the object having an attribute specified as "background" is positioned at the target pixel, the pixel value of the target pixel is changed based on the pixel value of the reference pixel. The method for changing a pixel value will be described below with reference to FIG. 7.

The third item will be described below. As indicated by a UI 176 (background) illustrated in FIG. 6B, the user specifies whether to perform thickness adjustment on an object having a graphic background by pressing either one of a "provide background" or a "no background" button. The object having a graphic background refers to an object in contact with a graphic object (an object positioned inside or adjacently to a graphic object). When the "provide background" button is pressed, a background attribute or a graphic attribute is specified as the attribute of the background of the object to be subjected to thickness adjustment. When the "no background" is pressed, only a background attribute is specified as the attribute of the background of the object to be subjected to thickness adjustment.

When the user presses the OK button illustrated in FIG. 6B, information set by the above-described UIs is stored in the storage unit 15.

<Flow of Thickening Processing>

The flow of the object thickening (expansion) processing to be performed by the image correction processing unit 123 will be described below with reference to FIG. 7. The following descriptions are on the premise that the settings illustrated in FIGS. 6A and 6B are made by the user, information about the settings is stored in the storage unit 15, and each unit of the image correction processing unit 123 refers to the stored information. Although processing in one processing window will be described below, the processing window is applied to each pixel of the CMYK image input to the image correction processing unit 123.

In step S1231, an attribute determination unit of the image correction processing unit 123 performs the following determination about the attributes of the target and reference pixels in the processing window. The attribute determination unit determines whether the attribute of the target pixel is based on the user specification with the UI 176 illustrated in FIG. 6B and the attribute of the reference pixel is any one attribute specified as an attribute to be subjected to thickening in the settings of the UI 172 by the user.

More specifically, in step S1231_1, when the user specifies "provide background" with the UI 176, the attribute determination unit determines whether the attribute of the target pixel is a background attribute or a graphic attribute. When the user specifies "no background" with the UI 176, the attribute determination unit determines whether the attribute of the target pixel is a background attribute. When the attribute of the target pixel is determined to be the background or graphic attribute in a case where the user specifies "provide background", and when the attribute of the target pixel is determined to be the background in a case where the user specifies "no background" (YES in step S1231_1), the processing proceeds to step S1231_2. When the attribute of the target pixel is determined to be neither a background nor a graphic attribute in a case where the user specifies "provide background", and when the attribute of the target pixel is determined not to be the background in a case where the user specifies "no background" (NO in step S1231_1), the processing ends. In step S1231_2, the attribute determination unit determines which of the attributes set to "+1" in the settings of the UI 172 by the user the attribute of the reference pixel is. According to the settings illustrated in FIG. 6A, the attribute determination unit determines whether the attribute of the reference pixel is the text, thin line, or graphic attribute. When the attribute of the reference pixel is determined to be the text, thin line, or graphic attribute (YES in step S1231_2), the processing proceeds to step S1232. When the attribute of the reference pixel is determined to be neither the text, thin line, nor graphic attribute (NO in step S1231_2), the processing ends. More specifically, when the reference pixel is an image attribute pixel, the density value of the target pixel is left unchanged. In other words, an image attribute object is not subject to thickening. The reason is as follows. An image attribute object is a photograph in many cases. Performing density value correction (change) (described below) on a photograph can reduce the clearness of the photograph. However, depending on the user settings illustrated in FIG. 6A, an image attribute object can also be subjected to thickening.

In step S1232, a pixel value determination unit of the image correction processing unit 123 performs the following processing for each of the CMYK color planes. (1) In step S1232_1, the pixel value determination unit determines whether the pixel value of the target pixel is larger than a predetermined threshold value. (2) In step S1232_2, the pixel value determination unit determines whether the pixel value of the reference pixel is larger than a threshold value ("0" or "255" as described above) based on the setting of the UI 174 illustrated in FIG. 6B. A series of determination processing in (1) and (2) will be described below. When the two pixel values are determined to be greater than the respective threshold values (YES in steps S1232_1 and S1232_2) for all the color planes, the processing proceeds to step S1233. When at least one of the two pixel values is determined not to be greater than the threshold value (NO in step S1232_1 or S1232_2) for at least one color plane, the processing ends.

When the predetermined threshold value to be used in determining the pixel value of the target pixel is the minimum pixel value (minimum density value) of "0", the object can be thickened if the density of the background of the object (density value of the reference pixel) is not zero. When the predetermined threshold value is approximately a pixel value (density value) of "150", the object can be thickened if the background of the object is dense to a certain extent. Although, according to the present exemplary embodiment, a designer of the image forming apparatus sets the predetermined threshold value, the user can set the threshold value.

In step S1233, a density correction unit of the image correction processing unit 123 corrects (changes), based on the pixel value of the reference pixel, the pixel value of the target pixel in the color plane. There are two different methods for correcting the pixel value: a correction method 1 (step S1233_2) and a correction method 2 (step S1233_3).

Which of the correction methods 1 and 2 is to be used is determined by the settings of the UI 172 illustrated in FIG. 6A and the setting of the UI 176 illustrated in FIG. 6B (step S1233_1). More specifically, in step S1233_1, the density correction unit determines whether the same attribute is set to attributes to be subjected to thickening (attributes set to +1 by the user) specified by the settings of the UI 172 and the attributes specified as a background by the setting of the UI 176. In the example settings illustrated in FIGS. 6A and 6B, a graphic attribute is included in both the attributes specified by the settings of the UI 172 (a text attribute, a thin line attribute, and a graphic attribute) and the attributes specified as a background by the setting of the UI 176 (a background attribute and a graphic attribute). Therefore, the same attribute is determined to be set (YES in step S1233_1), and the processing proceeds to step S1233_2. In step S1233_2, the density correction unit corrects the pixel value of the target pixel with the correction method 1. If the example settings illustrated in FIG. 6A are left unchanged and "no background" is specified in the example setting of the UI 176 illustrated in FIG. 6B, only a background attribute is specified as a background. In this case, the same attribute is determined not to be set (NO in step S1233_1), and the processing proceeds to step S1233_3. In step S1233_3, the density correction unit corrects the pixel value of the target pixel with the correction method 2.

The correction method 1 will be described in detail below. In the correction method 1, the density correction unit performs the following processing (1) and (2) for each color plane. (1) The density correction unit compares the pixel value of the reference pixel with the pixel value of the target pixel. (2) When the pixel value of the reference pixel is greater than the pixel value of the target pixel, the density correction unit changes the pixel value of the target pixel to the pixel value of the reference pixel. When the pixel value of the reference pixel is not greater than the pixel value of the target pixel, the density correction unit leaves the pixel value of the target pixel unchanged. When processing is performed in this way, the pixel value of the target pixel becomes a mixture of the original pixel value of the target pixel for each color plane and the pixel value of the reference pixel for each color plane. More specifically, the density correction unit expands the object positioned at the reference pixel toward the object positioned at the target pixel to overlap the two objects with each other. This enables acquiring the effect that the object on the reference pixel side is thickened toward the target pixel side.

Figure 5A:
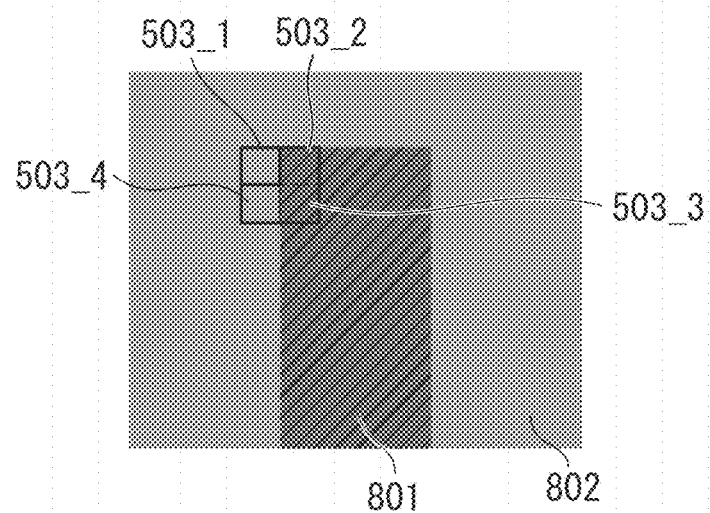
FIGS. 5A and 5B illustrate thickening processing.
Figure 5B:
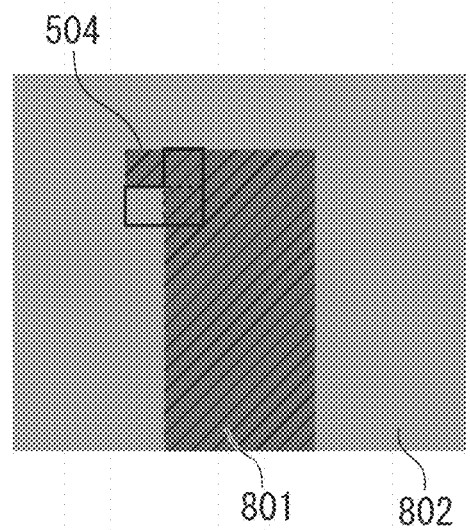

If the above-described correction method 1 is used, the pixel value of a target pixel 503_1 illustrated in FIG. 5A is changed to the pixel value of a reference pixel 503_2 or 503_3 for the color planes in which the pixel value of the target pixel is less than the pixel value of the reference pixel. Performing such processing enables acquiring the pixel value of a target pixel 504, as illustrated in FIG. 5B. For example, as illustrated in FIG. 8, when the outlined text object 801 includes only the K color plane and the object 802 equivalent to the background includes only the C color plane, the target pixel 504 after change of the pixel value includes the K and C color planes. Which of the reference pixels 503_2 and 503_3 is to be used should be suitably determined. For example, a larger pixel value can be used.

With the correction method 2, the density correction unit changes the pixel value of the target pixel to the pixel value of the reference pixel for all the color planes. More specifically, the density correction unit overwrites (replaces) the pixel value of the target pixel with the pixel value of the reference pixel. This enables the target object to be thickened to become thick (expand) without being mixed with the color of other objects. For example, the correction method 2 is applied to a case where "text: +1, thin line: +1, graphic: 0" is set in the UI 172 illustrated in FIG. 6A or a case where "no background" is set in the UI 176. When "provide background" is set in the former case, the outlined text 801 in the graphic 802 illustrated in FIG. 8 becomes thick (expands) without being mixed with the color (C color plane) of the graphic 802.

The correction method 1 is required in addition to the correction method 2 for changing the pixel value of one object to the object pixel value of the other object at the boundary between the objects because the same attribute (graphic attribute) is included in the settings of the UI 172 and 176. In such settings, the pixel value is also changed when graphic attribute objects are in contact with each other. However, since the density correction unit is unable to determine which of the objects is an outlined text, the correction method 1 is used to generate a mixed color of the two objects at the boundary thereof to adjust the thickness of the objects.

As described above, the density correction unit suitably selects either of the two different correction methods, and changes the pixel value of the target pixel based on the pixel value of the reference pixel. Then, the processing proceeds to step S1234.

In step S1234, an attribute correction unit of the image correction processing unit 123 corrects the attribute of the target pixel based on the attribute of the reference pixel. For example, when the reference pixel has a text attribute and the target pixel has a graphic attribute, the attribute correction unit changes the target pixel to a text attribute.

Figure 7:
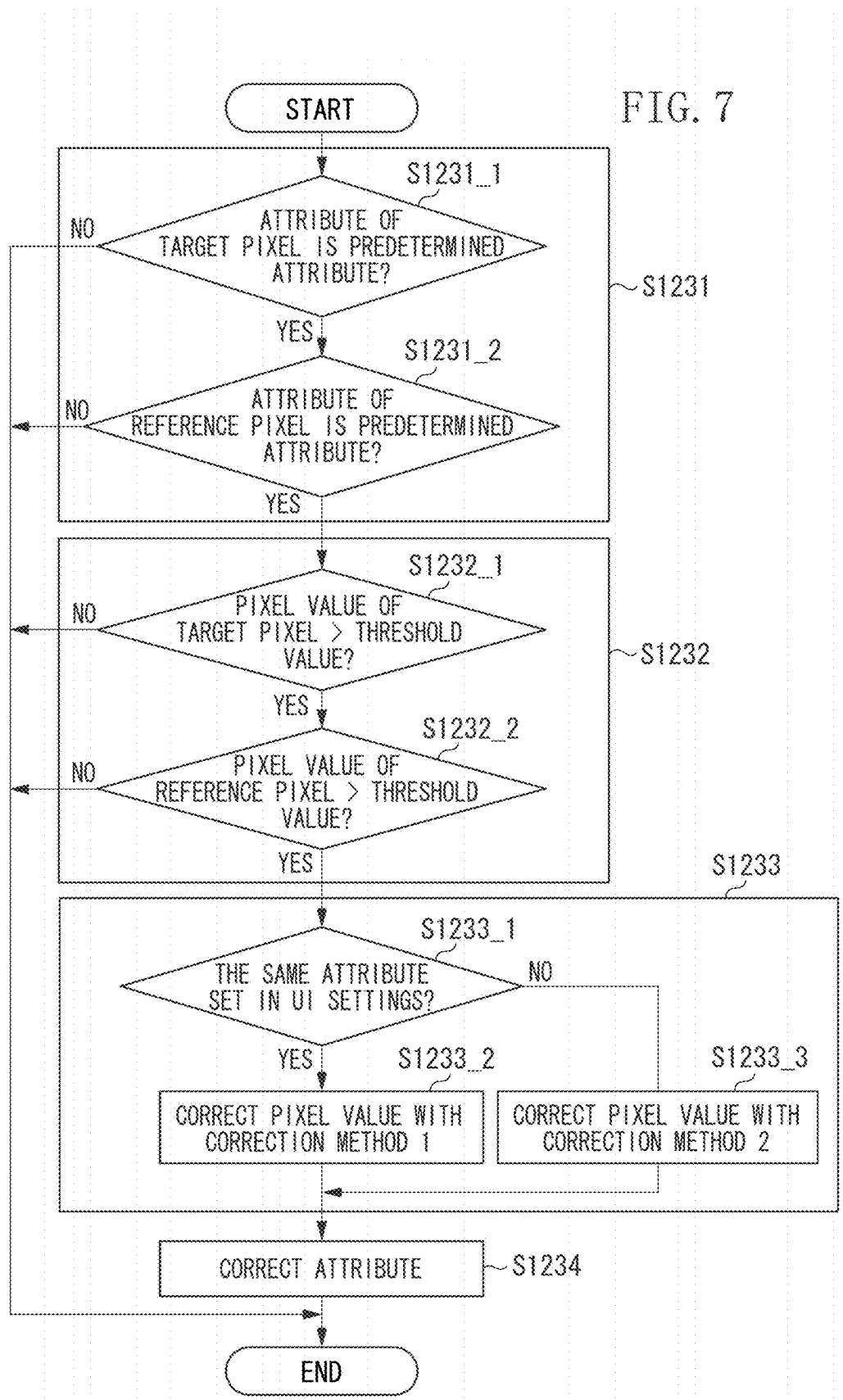
FIG. 7 is a flowchart illustrating thickening processing.

According to the above-described processing flow illustrated in FIG. 7, an object of an attribute to be subjected to thickening can be thickened both in a case where the attribute of the target to be thickened differs from the adjacent attribute and a case where the attribute of the target to be thickened is the same as the adjacent attribute. For example, even in a case where a graphic attribute object is adjacent to a background attribute pixel and in a case where a graphic attribute object is adjacent to a graphic attribute pixel, the object can be thickened. As a result, it becomes possible not only to thicken an outlined text surrounded by a background attribute, but also to thicken an outlined text included in a graphic.

In a case where a graphic attribute pixel is adjacent to a text attribute pixel, the density value of the graphic attribute pixel is corrected (changed) based on the density value of the text attribute pixel. The density value of the text attribute pixel is not corrected (changed) based on the density value of the graphic attribute pixel. This is because a graphic attribute pixel adjacent to a text attribute pixel is assumed to be not an outlined text pixel, but an originally graphic pixel such as a rectangle. In such a case, therefore, the attribute correction unit expands a text attribute object and does not expand a graphic attribute object.

The above-described processing units in steps S1233 and S1234 can be integrally formed as a correction unit (changing unit).

When the attribute of the target to be thickened is the same as the attribute of the background, a non-white object is thickened, whereas a white object is thinned. Some users do not like thinning of a white object. In this case, such a user can specify "no background" for the setting of the UI 176 illustrated in FIG. 6B to enable differentiating the attribute of the target to be thickened from a background attribute, thus preventing a white object from being thinned. A graphic attribute without a background can be thickened.

Although not described in the present exemplary embodiment, performing similar processing to the present exemplary embodiment enables thickness adjustment even when an image object exists in an image attribute object.

According to the present exemplary embodiment, the attribute determination unit determines whether to perform thickening when the attribute of the target pixel is the same as the attributes of the reference pixel in the user settings via the UI unit 17. However, instead of referring to the settings in the UI unit 17, the attribute determination unit can refer to an image to determine whether both the target and reference pixels include a graphic attribute. When both the target and reference pixels include a graphic attribute, the image correction processing unit 123 corrects the pixel value of the target pixel based on the pixel value of the reference pixel by using the correction method 1. When the target and reference pixels include different attributes, the image correction processing unit 123 can replace the pixel value of the target pixel with the pixel value of the reference pixel by using the correction method 2.

A second exemplary embodiment will be described below. According to the first exemplary embodiment, to thicken (expand) an object, the density correction unit changes (replaced) the pixel value of the target pixel to (with) the pixel value of the reference pixel for the color planes of the target pixel having a smaller pixel value than the pixel value of the reference pixel. The method for mixing the colors of the target and reference pixels in this way will largely change the color of a portion to be thickened depending on the colors of the target and reference pixels. For example, at the boundary between the C and M color planes, the color of a thickened portion becomes deep blue.

The present exemplary embodiment will be described below centering on a method for restricting color variation by performing thickening adjustment only when the target pixel has low density and the reference pixel has high density. Descriptions of processing similar to the processing according to the first exemplary embodiment will be omitted. The present exemplary embodiment is characterized in the determination in step S1232 and is similar in other steps to the first exemplary embodiment. Therefore, only the difference from step S1232 in the first exemplary embodiment will be described below.

In step S1232_1, the pixel value determination unit determines whether the target pixel is thin. When the pixel value of the target pixel is less than a predetermined value (thin) for all the color planes (YES in step S1232_1), the processing proceeds to step S1232_2. For example, the predetermined value is a value indicating the intermediate density, such as a pixel value of 128. When the pixel value of the target pixel is larger than the predetermined value for any one color plane (NO in step S1232_1), the processing exits the flowchart.

In step S1232_2, the pixel value determination unit determines whether the pixel value of the reference pixel has high density. When the pixel value of the reference pixel is greater than a predetermined value (thick) for any one color plane (YES in step S1232_2), the processing proceeds to step S1233. When the pixel value of the reference pixel is less than the predetermined value (NO in step S1232_2) for all color planes, the processing exits this flowchart. When "all colors" is specified by the setting of the UI 174, the predetermined value is a pixel value of 150 indicating the intermediate density for each of the CMYK color planes. When "black only" is specified, the predetermined value is a pixel value of 0 for each of the CMY color planes and a pixel value of 150 for the K color plane.

As described above, performing thickening adjustment only when the target pixel has low density and the reference pixel has high density enables restricting color variation, thus restricting color variation at a thickened portion.

A third exemplary embodiment will be described below centering on a method for restricting jaggies occurring when a text is outlined to become a graphic attribute text, depending on output conditions of an external application and a driver. In step S1234, the attribute correction unit assigns a text attribute to a portion having undergone thickness adjustment, and the smoothing processing unit 128 reduces jaggies. The method for reducing jaggies in this step will be described below. For processing identical to that according to the first and the second exemplary embodiments, redundant descriptions thereof will be omitted.

When a text attribute is output as it is as described above, halftone processing for texts is performed by the halftone processing unit 127, and therefore the text is drawn through high dot screen ruling with 200 or more lines. Further, the smoothing processing unit 128 performs processing for filling spaces on the dot screen at edge portions. This enables preventing jaggies from being conspicuous.

When a text attribute changes to a graphic attribute depending on output conditions, halftone processing for graphics is performed by the halftone processing unit 127, and therefore the text is drawn with low screen ruling having a line growth of about 130 to 170 lines. Since the smoothing processing unit 128 does not perform smoothing processing on a graphic attribute because of the above-described reason, jaggies are conspicuous. This means that there is a large difference between the image quality of a text output as a text attribute and the image quality of a text changed to a graphic attribute. Jaggies caused by not performing smoothing processing by the smoothing processing unit 128 are conspicuous in an object not having a graphic background and are inconspicuous in an object (text in a graphic) having a graphic background. A thin object having a graphic background can be blurred by the processing of the smoothing processing unit 128.

According to the present exemplary embodiment, the attribute correction unit leaves the attribute of a graphic attribute object having a background of a graphic (graphic attribute object) unchanged. The attribute correction unit changes (corrects) the attribute of a graphic attribute object not having a graphic background to a text attribute. This enables reducing the above-described image degradation due to jaggies.

Figure 9:
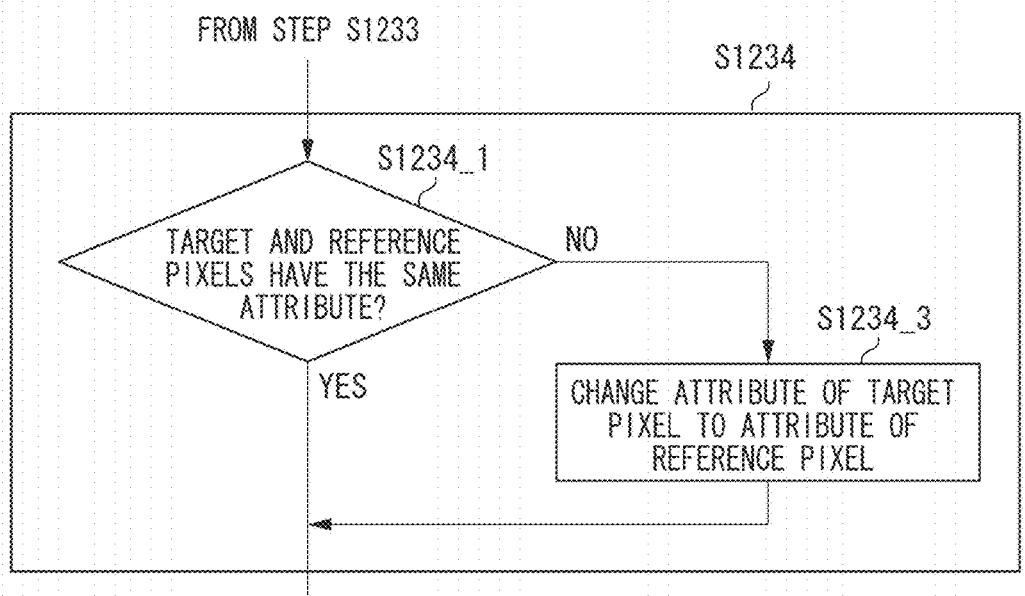
FIG. 9 illustrates an attribute correction unit according to a third exemplary embodiment.

In step S1234 illustrated in FIG. 7, the attribute correction unit according to the present exemplary embodiment performs the following processing (steps S1234_1 and S1234_3) illustrated in FIG. 9.

Figure 3B:
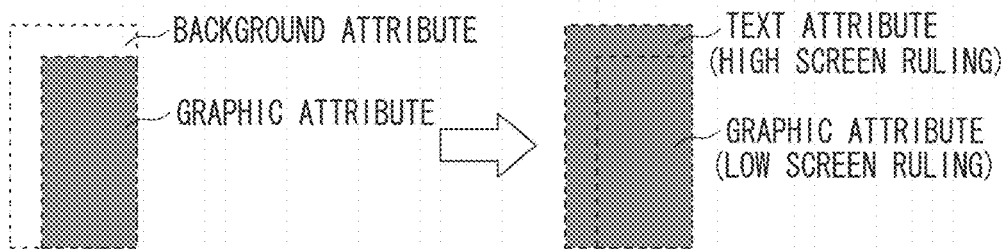
Figure 3C:
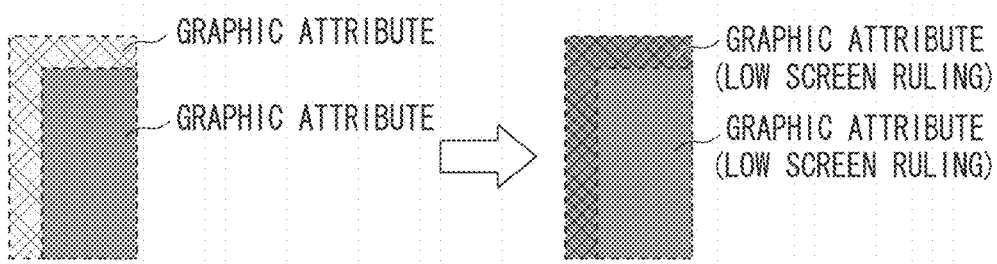

In step S1234_1, the attribute correction unit determines whether the target and reference pixels have the same attribute. When the target and reference pixels are determined to have the same attribute (YES in step S1234_1), the processing exits this flowchart. In this case, the attribute of the target pixel remains unchanged. As indicated in an example illustrated in FIG. 3C, when the target and reference pixels have the same attribute (when the target and reference pixels have a graphic attribute), the attribute of the portion where the object is thickened (expanded) remains unchanged.

When the target and reference pixels do not have the same attribute (NO in step S1234_1), the processing proceeds to step S1234_3.

In step S1234_3, when the target pixel includes a background attribute and the reference pixel has a text, a thin line, or a graphic attribute, the attribute correction unit changes the attribute of the target pixel to a text attribute. As indicated in an example illustrated in FIG. 3B, when the target and reference pixels include a specific combination of attributes (when the target pixel has a background attribute and the reference pixel has a graphic attribute), the attribute of the portion where the object is thickened (expanded) is changed from the background to a text attribute.

Similarly, in step S1234_3, when the target pixel includes a graphic attribute and the reference pixel includes a text, a thin line, or a graphic attribute, the attribute correction unit changes (replaces) the attribute of the target pixel to (with) the attribute of the reference pixel.

If the attribute of a pixel where jaggies are conspicuous is changed to a text attribute or a thin line attribute, the smoothing processing unit 128 performs smoothing to enable reducing jaggies.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-012865, filed Jan. 26, 2016, which is hereby incorporated by reference herein in its entirety.

What is claimed is:

1. A printing apparatus comprising:
   at least one processor that executes processes to:
      receive Page Description Language (PDL) data described in a page description language;

generate, according to the received PDL data, pixel data of a graphic object, pixels of the generated pixel data being associated with a graphic attribute;

determine, to make the graphic object widen, under at least a condition that an attribute associated with a pixel adjacent to one of the pixels of the generated pixel data is a graphic attribute, a density value of the adjacent pixel based on a result of a comparison of density values of a pixel of the generated pixel data and the adjacent pixel; and a printing unit configured to print an image based on the determination.

2. The printing apparatus according to claim 1, wherein the at least one processor further executes processes to:

change an attribute associated with the adjacent pixel to a character attribute; and perform screen processing with a first screen ruling on a pixel associated with a graphic attribute and to perform screen processing with a second screen ruling higher than the first screen ruling on a pixel associated with a character attribute.

3. The printing apparatus according to claim 1, wherein the PDL data includes point sequence data representing a shape of the outline.

4. A printing apparatus comprising:

at least one processor that executes processes to:

set, in print data, a target pixel and a reference pixel which is adjacent to the target pixel, wherein the reference pixel is included in an object representing a character;

determine, under at least a condition that the attribute of the target pixel is a background and the attribute of the reference pixel is a graphic, a density value of the target pixel based on a density value of the reference pixel; and a printing unit configured to print the changed image print data based on the determined density value.

5. The printing apparatus according to claim 4, wherein the at least one processor executes processes to:

determine an attribute for each of the target and reference pixels, wherein, based on the determination, the at least one processor executes processes to determines whether to change the density value of the target pixel based on the density value of the reference pixel.

6. The printing apparatus according to claim 4, wherein the at least one processor executes processes to:

receive PDL data including the outlined character from the external apparatus; and generate the pixel data based on the PDL data, wherein a graphic shape and an outlined character are represented by outline information in the PDL data, and wherein a character not outlined is represented by a character code in the PDL data, wherein, in the generation, each attribute is associated with each pixel included in the pixel data, and wherein the at least one processor executes processes to associate pixels of a graphic portion and a character portion represented by outline information with a graphic attribute, associates pixels of a character portion represented by a character code with a character attribute, and associates pixels of a portion including no object with a background attribute.

7. The printing apparatus according to claim 4, wherein, based on the determination indicating that the attribute of the target pixel is a graphic attribute and that the attribute of the reference pixel is a character attribute, the at least one processor executes processes to change the density value of the target pixel based on the density value of the reference pixel, wherein, based on the determination indicating that the attribute of the target pixel is a character attribute and that the attribute of the reference pixel is a graphic attribute, the at least one processor executes processes to leave the density value of the target pixel unchanged based on the density value of the reference pixel, and wherein, based on the determination indicating that the attribute of the target pixel is a graphic attribute and that the attribute of the reference pixel is a graphic attribute, the at least one processor executes processes to change the density value of the target pixel based on the density value of the reference pixel.

8. The printing apparatus according to claim 4, wherein based on the determination indicating that the attribute of the target pixel is a background attribute and that the attribute of the reference pixel is a character attribute, the at least one processor executes processes to change the density value of the target pixel based on the density value of the reference pixel.

9. The printing apparatus according to claim 4, wherein the at least one processor executes processes to:

set, based on a user instruction, whether to instruct the changing unit to change the density value of the target pixel when the target pixel is associated with a graphic attribute, wherein, based on a setting by a user to change the density value of the target pixel when the target pixel is associated with a graphic attribute, the at least one processor executes processes to change the density value of the target pixel determined to have a graphic attribute based on the density value of the reference pixel, and wherein, based on a setting by a user to leave the density value of the target pixel unchanged when the target pixel is associated with a graphic attribute, the at least one processor executes processes to leave the density value of the target pixel determined to have a graphic attribute unchanged based on the density value of the reference pixel.

10. The printing apparatus according to claim 4, wherein, based on the attribute of the reference pixel, the at least one processor executes processes to change the attribute of the target pixel of which the density value is to be changed.

11. The printing apparatus according to claim 10, wherein, based on a combination of the attributes of the target and reference pixels, the at least one processor executes processes to change the attribute of the target pixel of which the density value is to be changed to a character attribute.

12. The printing apparatus according to claim 11, wherein the at least one processor executes processes to perform dither processing based on the changed attribute on the target pixel of which the density value.

13. The printing apparatus according to claim 11, wherein the at least one processor executes processes to perform smoothing processing based on the changed character attribute on the target pixel of which the density value.

14. A printing method for processing image data of pixels including a character outlined by an external apparatus, the printing method comprising:

setting, in print data, a target pixel and a reference pixel which is adjacent to the target pixel, wherein the reference pixel is included in an object representing a character; and determining, under at least a condition that the attribute of the target pixel is a background and the attribute of the reference pixel is a graphic, a density value of the target pixel based on a density value of the reference pixel; and printing the print image data based on the determined density value.

15. The printing method according to claim 14, further comprising:

determining an attribute for each of the target and reference pixels, wherein, based on the determination by the determining, whether to change the density value of the target pixel based on the density value of the reference pixel is determined.

16. The printing method according to claim 15, wherein, based on the determination by the determining indicating that the attribute of the target pixel is a graphic attribute and that the attribute of the reference pixel is a character attribute, the density value of the target pixel is changed based on the density value of the reference pixel, wherein, based on the determination by the determining indicating that the attribute of the target pixel is a character attribute and that the attribute of the reference pixel is a graphic attribute, the density value of the target pixel is left unchanged based on the density value of the reference pixel, and wherein, based on the determination by the determining indicating that the attribute of the target pixel is a graphic attribute and that the attribute of the reference pixel is a graphic attribute, the density value of the target pixel is changed based on the density value of the reference pixel.

17. A printing method comprising:

receiving Page Description Language (PDL) data described in a page description language;

generating, according to the received PDL data, pixel data of a graphic object, pixels of the generated pixel data being associated with a graphic attribute;

determining, to make the graphic object widen, under at least a condition that an attribute associated with a pixel adjacent to one of the pixels of the generated pixel data is a graphic attribute, a density value of the adjacent pixel based on a result of a comparison of density values of a pixel of the generated pixel data and the adjacent pixel; and printing an image based on the determination.

18. The printing method according to claim 17, further comprising:

changing an attribute associated with the adjacent pixel to a character attribute; and performing screen processing with a first screen ruling on a pixel associated with a graphic attribute and to perform screen processing with a second screen ruling higher than the first screen ruling on a pixel associated with a character attribute.

19. The printing method according to claim 17, wherein the PDL data includes point sequence data representing a shape of the outline.

20. A printing apparatus comprising:

at least one processor that executes processes to:

receive Page Description Language (PDL) data described in a page description language;

generate, according to the received PDL data, pixel data of a graphic object, wherein the pixel data of the graphic object is associated with a graphic attribute;

determine, based on a comparison of density values of a pixel of the object and other pixel being associated with the graphic attribute, a density vale of the other pixel; and a printing unit configured to print an image based on the determination.

21. The printing apparatus according to claim 20 wherein, the at least one processor executes processes to determine the density value of the other pixel to be increased, in a case where a density value of the pixel of the object is higher than a density value of the other pixel.

22. A control method of a printing apparatus, the method comprising:

receiving Page Description Language (PDL) data described in a page description language;

generating, according to the received PDL data, pixel data of an object, wherein the pixel data of the object is associated with a graphic attribute;

determining, based on a comparison of density values of a pixel of the object and other pixel being associated with the graphic attribute, a density vale of the other pixel; and printing an image based on the determination.

* * * * *